Sept. 19, 1961 H. GANZ ET AL 3,000,430
METHOD AND MACHINE FOR CUTTING ADHESIVE BANDAGES FROM A WEB
Filed Feb. 5, 1957 4 Sheets-Sheet 1
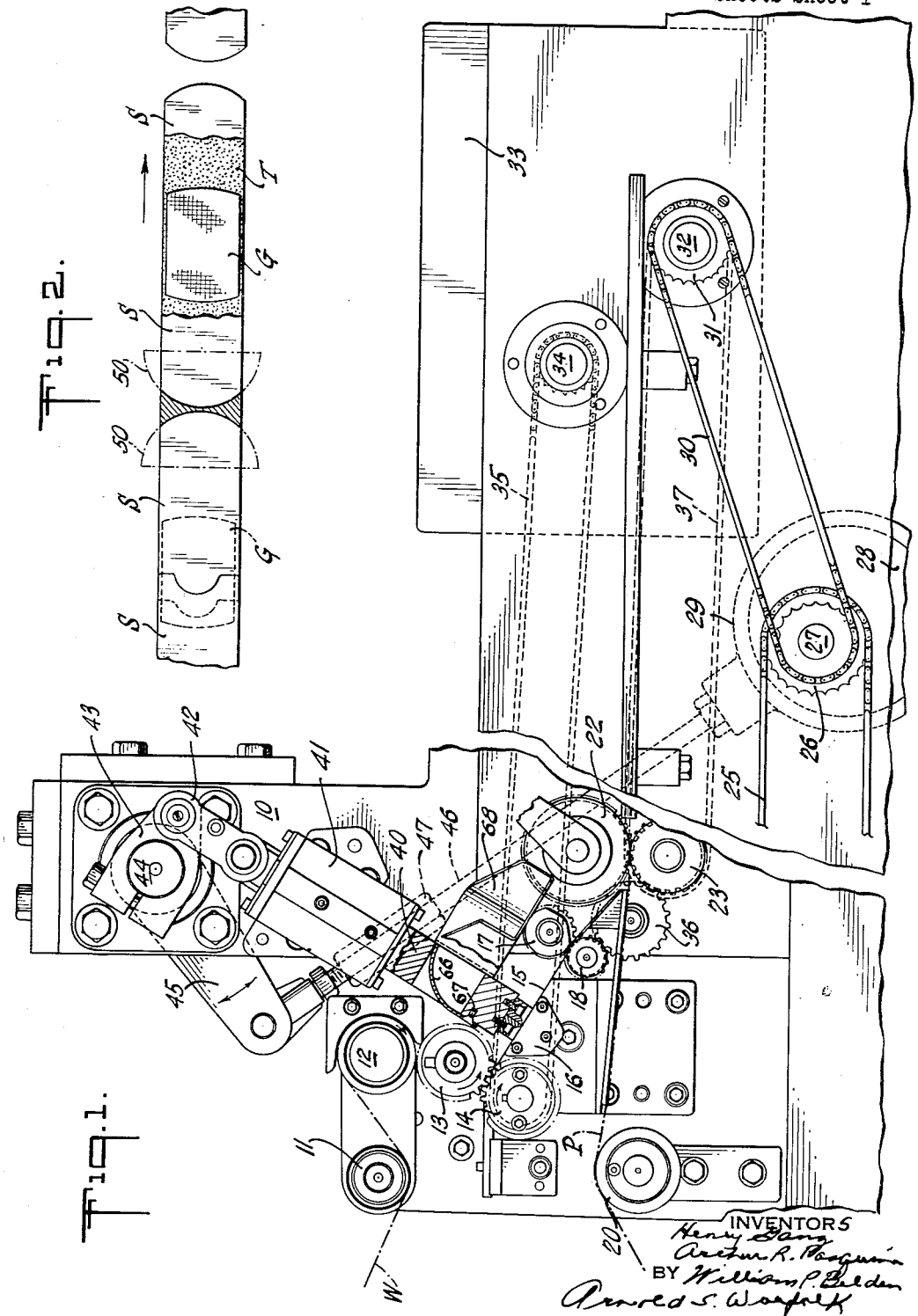
INVENTORS
Henry Ganz
Arthur R. Rooquin
BY William P. Belden
Arnold S. Worfolk
ATTORNEY

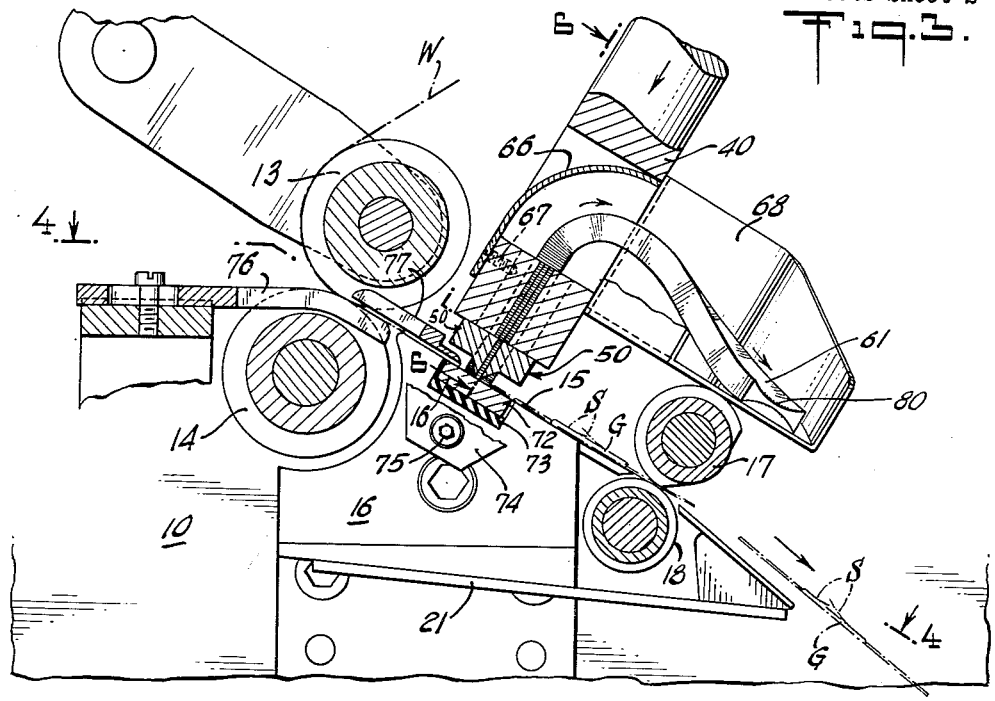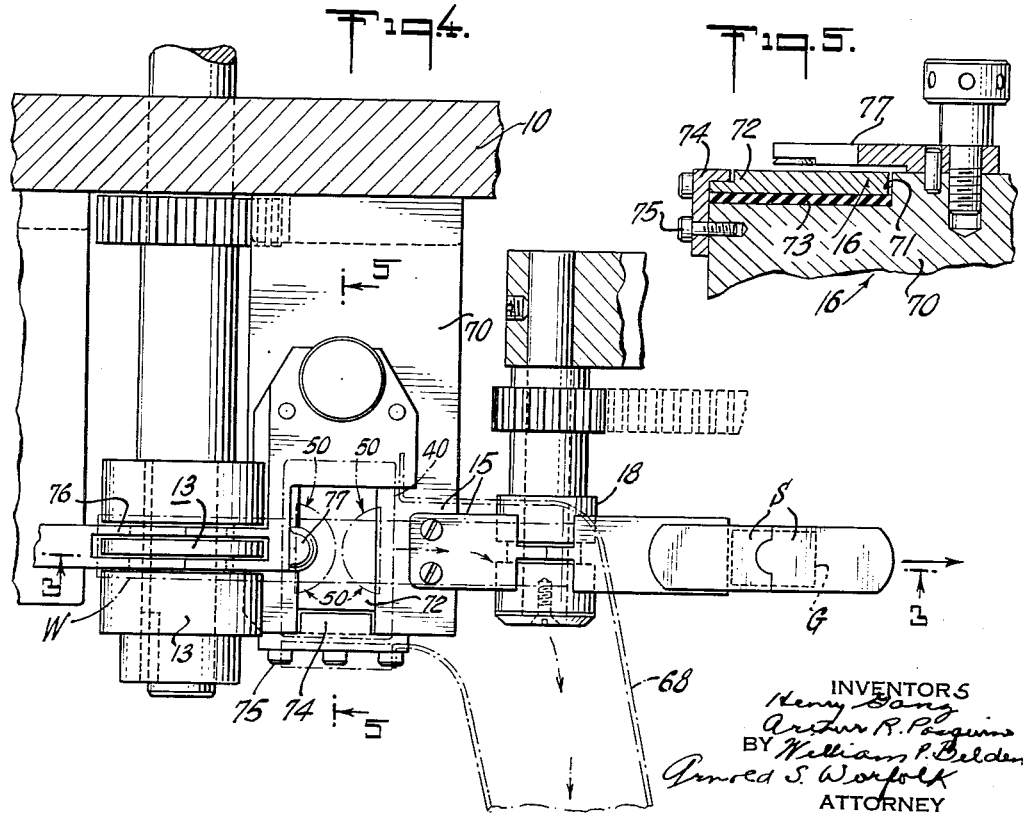

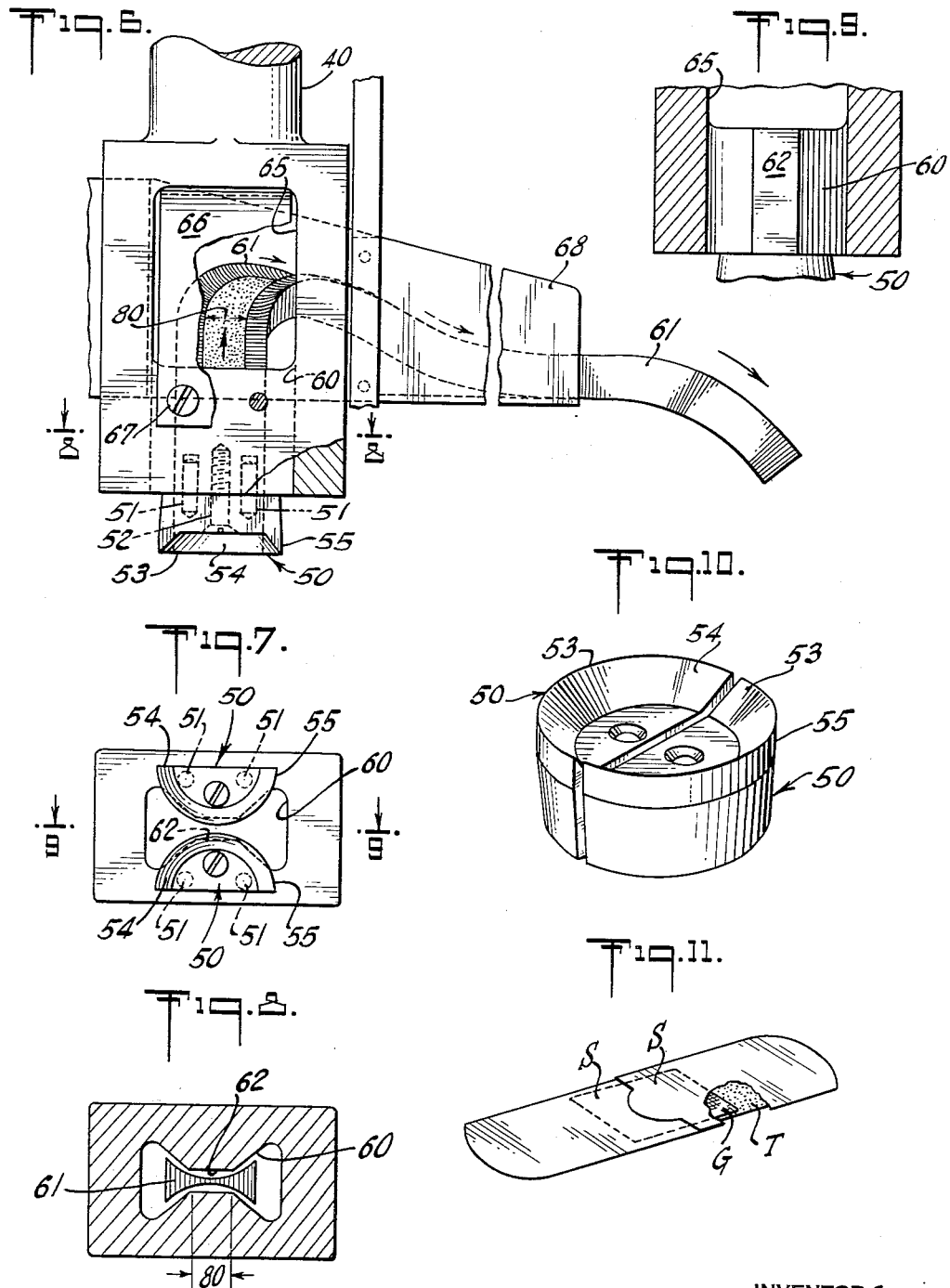

United States Patent Office 3,000,430
Patented Sept. 19, 1961

3,000,430
METHOD AND MACHINE FOR CUTTING
ADHESIVE BANDAGES FROM A WEB
Henry Ganz, West Englewood, Arthur R. Pasquine, Metuchen, and William P. Belden, Fanwood, N.J., assignors to Johnson & Johnson, a corporation of New Jersey
Filed Feb. 5, 1957, Ser. No. 638,265
20 Claims. (Cl. 154—1)

This invention relates to the manufacture of adhesive bandages, and more particularly of bandages of the type consisting of a length of adhesive tape fitted with a central bandage pad and protected until use by means of a removable cover layer.

Until recently, bandages of this type have been made with square ends, requiring only a simple slitting or shearing depending on whether the piece is cut from a web having the narrow or long dimension of the finished bandage. However, it has been found preferable in some cases to form the bandages with rounded ends or otherwise shaped ends. The present invention is concerned with the manufacture of bandages of this type, by cutting the pieces from a web having the narrow dimension of the finished bandage. The invention is also applicable to the production of butterfly bandages, in which the web has a width corresponding to the long dimension of the finished product, and to the production of patches and other pieces which may be of about the same width and length.

It is an object of the invention to provide automatic high speed mechanism for producing bandages and patches of the type indicated.

A further object of the invention is to provide an improved means for disposing of waste pieces such as are produced in the formation of such bandages or patches.

With these and other objects which will appear in the following full description in mind, the invention consists in the combinations and arrangements of parts and details of construction, which will now first be fully described with reference to the accompanying drawing and then be more particularly pointed out in the appended claims.

In the drawing:

FIG. 1 is a side elevation, somewhat schematic, of a bandage cut-off mechanism embodying the invention in a preferred form;

FIG. 2 is a flat view of the web from which the bandages are cut;

FIG. 3 is an enlarged fragmentary view, showing part of the mechanism of FIG. 1, and is principally in section on the line 3—3 of FIG. 4;

FIG. 4 is a view on the line 4—4 of FIG. 3;

FIG. 5 is a detail section on the line 5—5 of FIG. 4;

FIG. 6 is an enlarged elevation view in the direction of the arrows 6—6 of FIG. 3, showing the cutter element;

FIG. 7 is a bottom elevation of the cutter element of FIG. 6;

FIG. 8 is a section on the line 8—8 of FIG. 6;

FIG. 9 is a section on the line 9—9 of FIG. 7;

FIG. 10 is a perspective showing the formation of the cutting knives; and

FIG. 11 is a perspective of a finished bandage.

Figure 12:
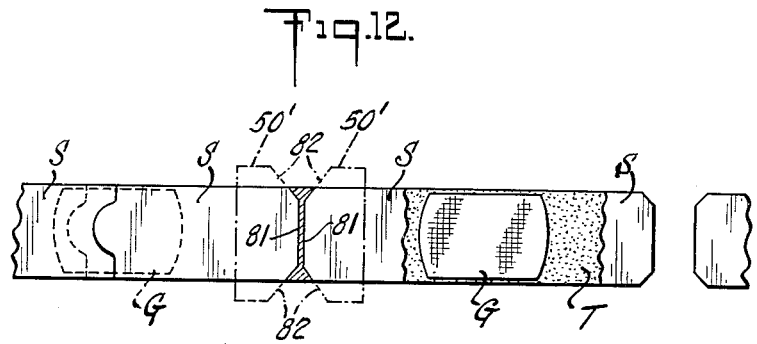

The bandage is manufactured on a machine which is generally of known type, and only so much of the machine as is necessary for a full understanding of the present invention is shown and described herein. A web W, formed by previous machine elements (not shown), comprises (as shown in FIGS. 2 and 11) a continuous strip T of adhesive tape, carrying at regular intervals on its adhesive surface gauze pads G, and protected by cover strips S which overlap above the pads G, the free outer ends of the strips S pointing rearwardly, as indicated. The web W is severed into lengths, as described below and combined with a web P which forms the outer wrapping. The mechanisms for wrapping the web P around the severed pads and for further severing between pads and transversely folding to close off the ends form no part of the present invention, and hence are not shown or described.

The strip T may be of woven textile material, paper or any of a variety of plastic or synthetic resin compositions, and a variety of adhesives may be used. In a preferred form, the strip is formed of a vinyl resin film possessing considerable elasticity and coated with a pressure sensitive adhesive. The cover strips S may also be formed of a variety of materials, including crinoline, but the preferred material is paper laminated on one side with a sheet of cellulose acetate to prevent permanent adhesion and to permit peeling off the tape. The cover strips S are held to the tape T with moderate temporary adhesion over the exposed surface between pads G, having been applied thereto with moderate pressure by previous mechanisms, not shown.

The machine includes a frame indicated at 10, and on which the various machine elements are mounted. The web W travels around guide rollers 11 and 12, between intermittent feed rolls 13, 14, and over a table 15 including a cutting anvil 16 from which the severed lengths are taken by continuous feed rolls 17, 18. The wrapping P is fed over a guide roller 20 and under table 21 to a pair of feed and folding rolls 22, 23, receiving the cut off bandage lengths from rolls 17, 18 and continuing on for further processing to produce the completed and packaged bandage.

The various rolls are driven continuously and intermittently, off a main sprocket drive 25 which through sprocket wheel 26 drives shaft 27. This shaft carries an eccentric 28 and strap 29 which operate the cutting mechanism as later described and also, through sprocket chain 30 and sprocket wheel 31, drives the input shaft 32 of an intermittent or Geneva drive mechanism 33. The output shaft 34 of the Geneva drive, through sprocket chain 35, drives the feed roll 14 previously referred to, which is geared to its companion roll 13 for driving this roll also. The rolls 17 and 18 are geared together and are driven through an idle gear 36 off the lower roll 23 of the pair 22, 23, which lower roll is driven continuously through a sprocket drive 37 off the input shaft 32 of the Geneva drive.

The cutter mechanism is of the so-called crush cutting type, in which a cutting edge cooperates with a flat anvil or supporting surface, severing the web by a pinching action as distinguished from a shearing action.

The cutter cooperating with anvil 16 previously referred to, comprises a reciprocable plunger or ram 40 which is slidably carried in a bearing 41 and reciprocated through a link 42 by an arm 43 of a bell crank rotatably carried on shaft 44 and the other arm 45 of which is connected to the eccentric strap 29 by a link or pitman 46 which includes a turn buckle 47 for adjusting the stroke.

The lower end of ram 40 carries cutting knives, the form and mounting of which are best shown in FIGS. 6–10. As there shown, there are two cutters 50 which may be and are shown as identical in construction. The cutters are removably mounted at the lower end of the ram 40 by means of dowels 51 and screws 52. They have cutting edges 53 of circular arcuate form, and defined by frusto-conical inner surfaces 54 and cylindrical ground outer surfaces 55. The cylindrical ground surfaces 55 extend upwardly for about an eighth of an inch or so and above this point the cutter faces are relieved or tapered, a draft angle of 2° or so being suitable.

Between the cutters 50, the ram 40 is formed with a central open channel 60 having roughly the shape of an hour-glass and adapted to accommodate the cut out waste pieces 61, as shown in FIG. 8. The neck or narrow central part 62 of the channel 60 is sufficiently wide as to permit easy passage of a stack of waste pieces 61 while affording a loose clearance so as to prevent binding or catching thereof.

Channel 60 leads to an opening 65 in the ram 40, within which there is positioned a curved guide piece 66 fastened to the ram by screws 67 and which deflects the stack of waste pieces outwardly into a discharge chute 68, also carried on the ram and reciprocating therewith.

The anvil identified generally by the reference numeral 16 comprises a body 70 (FIGS. 3–5) mounted on the machine frame and having a recess 71 which receives the anvil proper 72. The element is supported on rubber 73, permitting a limited vertical yielding movement and is held in place by a cap and cover plate 74 attached to the body 70 by screws 75. Strippers 76 and 77, generally of known form, serve respectively to keep the web W from following around on the roll 14, to keep it from following around on the cooperating roll 13, and to hold it down on the feed table 15.

In operation, the web W is fed intermittently by the rolls 13, 14, requiring a half rotation (about 180°) of these rolls to feed a bandage length, which length, in a typical case and in the machine illustrated, is three inches. The ratio between driving time and stopped time in the Geneva drive is, of course, approximately 1–1. The mechanism driving the cutter ram 40 is synchronized with the drive of the rolls 13, 14, so that the cutting action occurs during the time when the web W is stationary. The cut is a "crush" cut or pinch cut, in which the relatively obtuse (about 45°) cutting edge 53 cooperates with the flat surface of the anvil part 72 to sever the web. On the up stroke of the ram 40, the cut out waste piece 61 moves upward with the ram, but the unsevered web end preceding the ram is held down on table 15 by stripper 77. The severed bandage length has also by this time been taken by rolls 17, 18 and does not tend to follow the ram back as it makes its return stroke.

A major difficulty in severing a bandage length otherwise than by a simple cut, has been in the handling or disposition of any waste pieces which are formed, and this difficulty has been found to be eliminated completely in the mechanism of the present invention. In this connection, there are a number of important features of the construction to be noted. First of all, it should be noted that the waste piece 61 (the successive pieces are all of uniform profile as shown in FIG. 8) at its central and narrowest part may be only about one thirty-second of an inch in width or even less, while the wide end of the waste piece may be of considerable width, as, for example, about three-eighths of an inch. Before the cut is made, the material engaged by the knife edges 53 will first be compressed under these knife edges, squeezing the adhesive layer outwardly to each side of the edge. At the center of the waste piece where the knives are spaced about one-sixteenth of an inch apart, there is very little space for flow of this material and it accordingly is compressed, so that as the return stroke commences, a small amount of the adhesive is exuded and this appears as a definitely perceptible stripe on the face of the stack of adhesive strips and extending over approximately the width indicated at 80. As will be apparent, the width of this stripe, 80, will depend upon the shape of the cutting knives and their spacing from each other, and hence is controllable. Where the bandage is about three-quarters of an inch wide, this stripe may be about a quarter of an inch wide. The effect of the exuding of this adhesive stripe is to join the stack of cut out waste pieces together with sufficient firmness so that they handle as a unit. The cylindrical lower faces of the cutters 50 fit the cut pieces and since the exuded adhesive is in contact with them, the lifting and removal of the waste pieces is assured. However, the pushing upward of the successive waste pieces under these conditions requires considerable pressure and for this reason the faces of the cutters 50 are relieved, as mentioned above, about one-eighth of an inch or so from their edges. By suitably selecting the vertical length below the point of relief, it is insured, first, that the existing stack of waste pieces will be firmly pressed against the newly cut piece so as to incorporate it in the existing stack, while at the same time it is possible to move the stack upwardly through the channel between the knives without requiring undue force. Above the knives, the channel 60 is formed with flats at each side of its neck 62, which flats extend chordwise of the arc of the stack of waste pieces 61. The flats being somewhat wider than the exuded adhesive stripe 80 and the wide ends of the waste pieces 61 being positioned to either side of these flats for holding the stack of waste pieces generally in line, it will be apparent that the surfaces of the channel 60 are effectively protected from contact with the exuded adhesive. The guide 66 and channel 60 bend the stack of waste pieces 61 first out of the vertical into a generally horizontal direction, and then out of the line of feed in the machine into a line at right angles thereto, so that the stack of waste pieces 61 is easily and simply fed out to one side of the machine into any convenient waste receptacle. Since the guide 66 and chute 68 are mounted on the ram itself, these elements are subjected to constant jogging so as to produce a smooth feed and movement of the stack of waste pieces.

The temporary bond between the facing paper cover of the bandage and the plastic tape is reasonably strong, requiring considerable tension in separating the elements when the bandage is to be used, but by reason of the wide surfaces in contact and necessary variations in the pressure and adhesive conditions at the time of their being brought together, there is a certain amount of irregularity both as to amount of adhesion and location of adhesion, so that there is a tendency to have the cover piece come loose suddenly and off the plastic tape and then snap back around itself, sticking to its own adhesive face. The cutting of the bandage end to the rounded shape shown ameliorates this condition. When this is done with the crush cut of the present invention, a further improvement exists by reason of the fact that at the time of cutting and before the severing action occurs, the extreme end of the bandage length is compressed under terrific pressure and along a very thin line at its very edge so that a definite terminal adhesion is obtained, tending to eliminate the snapping back of the plastic adhesive tape as the cover parts from it.

While the invention has been disclosed as applied to a specific machine utilizing a reciprocating cutter ram located above the anvil, it will be apparent that it is also applicable to machines in which these parts are inverted and, in its broader aspect, to rotary, as distinguished from reciprocating machines. Also, by suitably changing the shape of the cutting knives, a variety of products may be produced. Some of these products are illustrated in FIG. 12 of the drawing.

Referring now to FIG. 12 of the drawing, it will be seen that the product there shown is similar to that of FIGS. 2 and 11, except for the shaping of the end of the bandage. The knives 50' have cutting edges having parallel straight central portions 81 and slanted edges 82, producing products with corresponding end shapes, as indicated, the bandage being essentially square-ended except for the removal of its corners. The waste pieces produced are similar in that they have a narrow central portion and wider ends and may form a cohesive stack, as before, adhesive being exuded from the area cut by the straight portions 81 and not over the wider end portion, as before.

Figure 13:
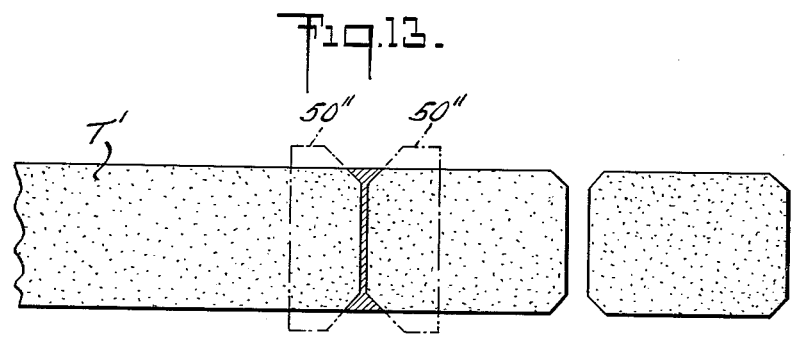

FIG. 13 of the drawing shows a further product which may be produced. In this case the adhesive covered web T' is wider and the gauze and facing are omitted, producing adhesive patches. The knives 50'' are shaped similarly to the knives 50' of FIG. 12.

Figure 14:
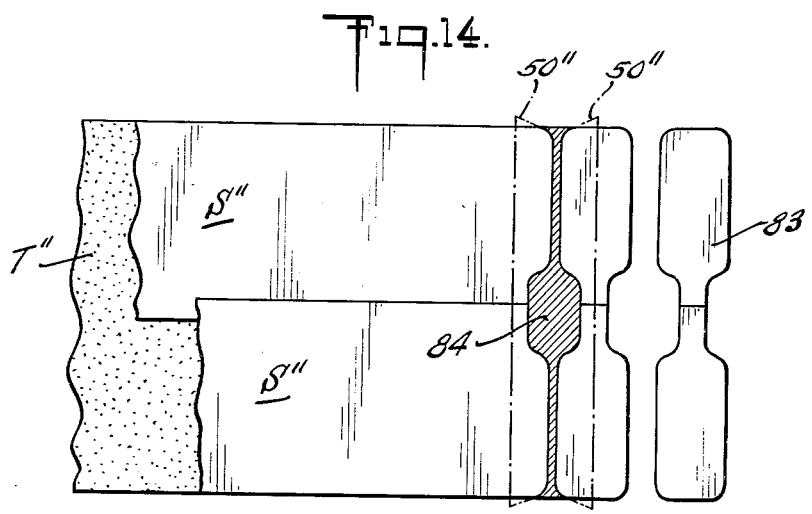

FIG. 14 shows a still further product. In this case a wider web T'' of adhesive covered material is used and the facing layers S'' run parallel to the web, overlapping each other centrally of the web, as indicated. The knives 50'' have the contour indicated, producing butterfly dressings 83. The waste pieces 84 have wide ends and centers with narrow sections to each side of their centers, again permitting the formation of a cohesive stack with adhesive along localized stripes or areas of its sides.

What is claimed is:

1. A web cut-off mechanism comprising a web support and a crush cutter cooperating therewith, the crush cutter comprising spaced knives shaped for cutting and severing the web transversely and also severing waste pieces between the said knives, a movable knife support and means mounting the knives thereon, the knife support having a passage communicating with the space between the knives for receiving the waste pieces, mechanism for moving the said knife support to bring the knives periodically against the web support and means advancing the web in timed relation thereto.

2. A web cut-off mechanism according to claim 1, in which the web support comprises a flat anvil and the knife support comprises a reciprocable ram.

3. In a machine for manufacturing adhesive products from a web comprising a continuous length of adhesive tape, cut-off mechanism comprising an anvil and a crush cutter cooperating therewith, the crush cutter comprising spaced knives shaped for cutting and severing the web transversely and also severing waste pieces between the knives, and a reciprocable ram and means mounting the knives thereon, the ram having a passage communicating with the space between the knives for receiving the waste pieces.

4. Cut-off mechanism according to claim 3, in which the said knives are shaped to be closer together at location toward the middle of the web and diverge from each other at the edges of the web.

5. Cut-off mechanism according to claim 4, in which the knives are arcuate and their convex faces face each other.

6. In a machine for manufacturing adhesive products from a web comprising a continuous length of adhesive tape, cut-off mechanism comprising an anvil and a crush cutter cooperating therewith, the crush cutter comprising knives arranged with their convex faces facing each other for cutting and severing the web transversely, a reciprocable ram and means mounting the knives thereon, the ram having a passage communicating with the space between the knives for receiving the waste pieces, and an arcuate guide in the passage for deflecting the waste pieces outwardly of the ram.

7. In a machine for manufacturing adhesive products from a web comprising a continuous length of adhesive tape, cut-off mechanism comprising an anvil and a crush cutter cooperating therewith, the crush cutter comprising spaced knives arranged for cutting and severing the web transversely and also severing waste pieces between the knives, the said knives having parallel facing surfaces extending back part way from their edges and being tapered above said parallel surfaces to provide gradually increasing clearance for passage of the waste pieces, and a reciprocable ram and means mounting the knives thereon, the ram having a passage communicating with the space between the knives for receiving the waste pieces.

8. In a machine for manufacturing adhesive products from a web comprising a continuous length of adhesive tape, cut-off mechanism comprising an anvil and a crush cutter cooperating therewith, the crush cutter comprising spaced knives shaped for cutting and severing the web transversely and forming waste pieces having wide ends and narrow mid-sections, and a reciprocable ram and means mounting the knives thereon, the ram having a passage communicating with the space between the knives for receiving the waste pieces.

9. In a machine for manufacturing adhesive products from a web comprising a continuous length of covered adhesive tape, cut-off mechanism comprising an anvil and a crush cutter cooperating therewith, the crush cutter comprising knives shaped for cutting and severing the web transversely and also severing waste pieces between the knives, and spaced apart at a sufficiently small distance as to squeeze adhesive laterally outward from the waste pieces, and a reciprocable ram and means mounting the knives thereon, the ram having a passage communicating with the space between the knives for receiving a stack of waste pieces.

10. Cut-off mechanism according to claim 9, in which the knives are shaped to form waste pieces having narrow portions and wider portions and the knives are spaced to thus squeeze out adhesive where the waste pieces are narrow while leaving the adhesive in position on the waste pieces where they are wider.

11. Cut-off mechanism according to claim 10, in which the said passage has walls shaped to contact the waste pieces in the said stack against their wider parts, where adhesive is left in position, and thus hold the narrower parts, where adhesive is squeezed out, out of contact with the said walls.

12. In a machine for manufacturing adhesive products from a web comprising a continuous length of covered adhesive tape, cut-off mechanism comprising an anvil and a crush cutter cooperating therewith, the crush cutter comprising arcuate knives arranged with their convex faces facing each other for cutting the web transversely and thus forming waste pieces having wide ends and narrow mid-sections, the knives being spaced from each other so as to squeeze adhesive out in the mid-sections of the waste pieces to form a coherent stack while leaving the edges of the ends of the waste pieces substantially free of adhesive, and a reciprocable ram and means mounting the knives thereon, the ram having a passage communicating with the space between the knives for receiving the stack of waste pieces.

13. In a machine for manufacturing adhesive bandages from a web comprising a continuous length of adhesive tape having bandage pads and cover strips at regular intervals along its adhesive surface, cut-off mechanism comprising an anvil and a crush cutter cooperating therewith, the crush cutter comprising arcuate knives arranged with their convex faces facing each other for cutting the web transversely and thus forming waste pieces having wide ends and narrow mid-sections, the knives being spaced from each other so as to squeeze adhesive out in the mid-sections of the waste pieces to form a coherent stack while leaving the edges of the ends of the waste pieces substantially free of adhesive, and a reciprocable ram and means mounting the knives thereon, the ram having passage above the knives for receiving the stack of waste pieces, the said passage having walls spaced from the said mid-sections of the waste pieces and shaped to engage the stack of waste pieces to each side of the said mid-sections for guiding the stack up the ram.

14. Cut-off mechanism according to claim 13, in which the said passage has a wall in spaced relation to the said narrow mid-sections of the stack of waste pieces and terminating in edges positioned for engagement with the said wide ends of the waste pieces which are substantially free of adhesive.

15. In a crush cutting mechanism for use with covered adhesive tape, and in combination, an anvil, a reciprocable ram, a cutter carried by the ram for severing a piece from the covered adhesive tape, having a passage permitting movement toward the ram of successive severed pieces as a stack and having cooperating cutting edge portions spaced apart by a predetermined distance so as to squeeze out adhesive at the edges of the pieces to form a coherent stack, the ram having a passage for accommodating the said stack and guiding the same.

16. In a crush cutting mechanism for use with covered adhesive tape, and in combination, an anvil, a reciprocable ram, a cutter carried by the ram for severing a piece from the covered adhesive tape, having a passage permitting movement toward the ram of successive severed pieces as a stack and having cooperating cutting edge portions spaced apart by a predetermined distance so as to squeeze out adhesive along part of the edges of the pieces to form a coherent stack while leaving the rest of the said edges substantially free of adhesive, the ram having a passage for accommodating the said stack and guiding the same.

17. The combination according to claim 16, in which the said passage has wall portions engaging the edges of the pieces where they are substantially free of adhesive and holding the parts where adhesive is squeezed out away from the passage walls.

18. Method of forming adhesive products which comprises crush cutting waste pieces in succession at regular intervals from an adhesive covered web, forming a stack from the pieces as cut and subjecting each piece as added to the stack to pressure causing adhesion to the preceding piece, so as to form a coherent stack, and guiding the said stack away from the web.

19. Method of forming adhesive products which comprises crush cutting pieces of uniform profile in succession at regular intervals from a covered adhesive tape web while squeezing out adhesive at parts of the edges of the said pieces and leaving the adhesive in position at other parts thereof, the location of the parts of the edges of the pieces where the adhesive is squeezed out being the same from piece to piece forming a stack from the pieces as cut and subjecting each piece as added to the stack to pressure causing adhesion by means of the adhesive so squeezed out therefrom, so as to form a coherent stack, and guiding the said stack away from the web.

20. Method of forming adhesive products which comprises joining a succession of overlapped cover strips to an adhesive tape under relatively light pressure to produce temporary adhesion over areas of the said tape and cover pieces, and crush cutting in the said areas to sever product lengths while subjecting the tape and cover at the edge of the cut to heavy pressure, thus forming at the cut edge a line of relatively strong adhesion.

References Cited in the file of this patent

UNITED STATES PATENTS

| | | |
|---|---|---|
| 739,090 | Kupfer et al. | Sept. 15, 1903 |
| 1,618,453 | Lichter | Feb. 22, 1927 |
| 1,802,814 | Henderson | Apr. 28, 1931 |
| 1,909,841 | Perryman | May 16, 1933 |
| 1,995,076 | Perryman | Mar. 19, 1935 |
| 2,033,553 | Scholl | Mar. 10, 1936 |
| 2,142,566 | Lehman | Jan. 3, 1939 |
| 2,187,651 | Jackson | Jan. 16, 1940 |
| 2,258,070 | Sawle | Oct. 7, 1941 |
| 2,618,311 | Parker | Nov. 18, 1952 |
| 2,789,640 | Belden | Apr. 23, 1957 |